United States Patent [19]
Rude

[11] Patent Number: 5,988,200
[45] Date of Patent: Nov. 23, 1999

[54] REPETITIVE STAMPED VALVE GUARD

[75] Inventor: Arthur D. Rude, Ash Grove, Mo.

[73] Assignee: Custom Metalcraft, Inc., Springfield, Mo.

[21] Appl. No.: 08/931,511

[22] Filed: Sep. 16, 1997

[51] Int. Cl.$^6$ .................................................. F16K 35/00
[52] U.S. Cl. ............................. 137/15; 137/377; 137/382
[58] Field of Search .................................. 137/377, 382, 137/15

[56] References Cited

U.S. PATENT DOCUMENTS

| | | | |
|---|---|---|---|
| D. 31,742 | 10/1899 | Wilhelm . | |
| D. 296,027 | 5/1988 | Dietzen | D34/39 |
| D. 319,286 | 8/1991 | Waltke et al. | D23/206 |
| 976,475 | 11/1910 | Livingston | 137/382 |
| 1,469,646 | 10/1923 | Rowland . | |
| 1,602,506 | 10/1926 | Rowland . | |
| 2,327,654 | 8/1943 | McIntosh . | |
| 2,476,578 | 7/1949 | Barnwell . | |
| 2,946,223 | 7/1960 | Lauer, Jr. . | |
| 3,963,144 | 6/1976 | Berwald | 220/85 P |
| 4,220,097 | 9/1980 | Wempe et al. | 137/377 |
| 4,605,126 | 8/1986 | Goedken et al. | 206/386 |
| 4,635,676 | 1/1987 | Reilley | 137/382 |
| 4,697,528 | 10/1987 | Rehbein | 105/358 |

*Primary Examiner*—A. Michael Chambers
*Attorney, Agent, or Firm*—Bergert & Bergert

[57] ABSTRACT

A valve guard for the protection of a bottom discharge valve on a portable tank is formed of a single elongated piece of metal and has a central stabilizing ridge which extends outwardly from the front wall of the valve guard and which runs nearly the full length of the valve guard. The valve guard has a deflector arm at each end which extends out from the valve guard body at an angle and which cooperates with the tank legs to deflect any misguided forklifts or other machinery away from the valve on the underside of the tank. The central ridge is rounded and can have a width from approximately one-fourth to approximately one-third the width of the front wall of the valve guard. The valve guard is lightweight, durable, and can be formed quickly and economically through a rapid sequence of metal stamping operations.

12 Claims, 2 Drawing Sheets

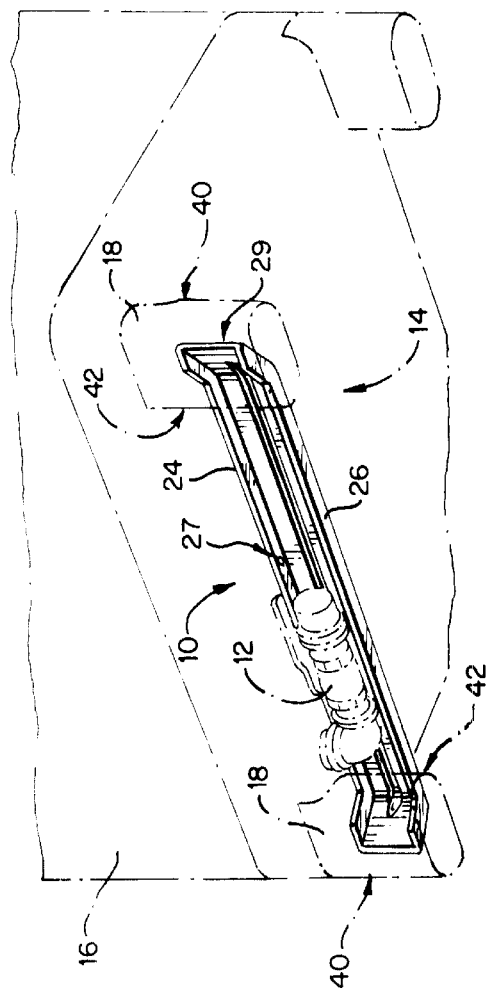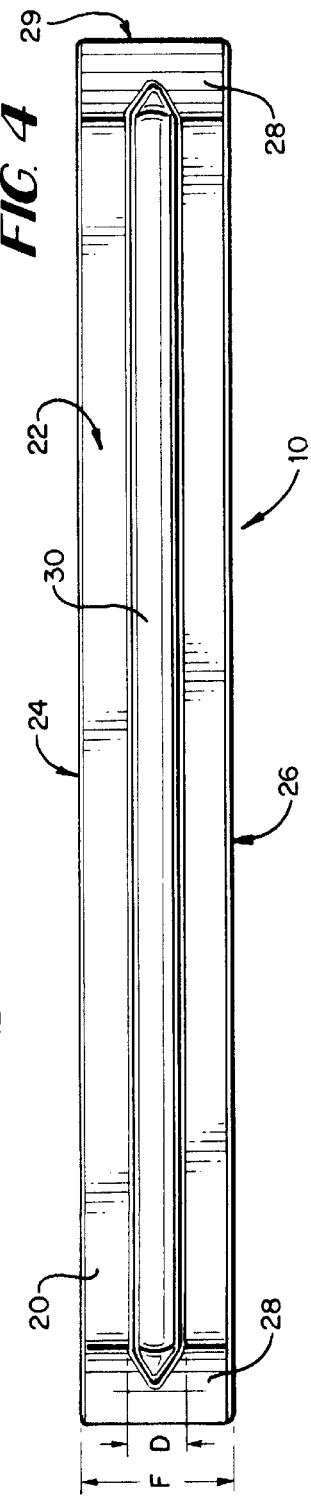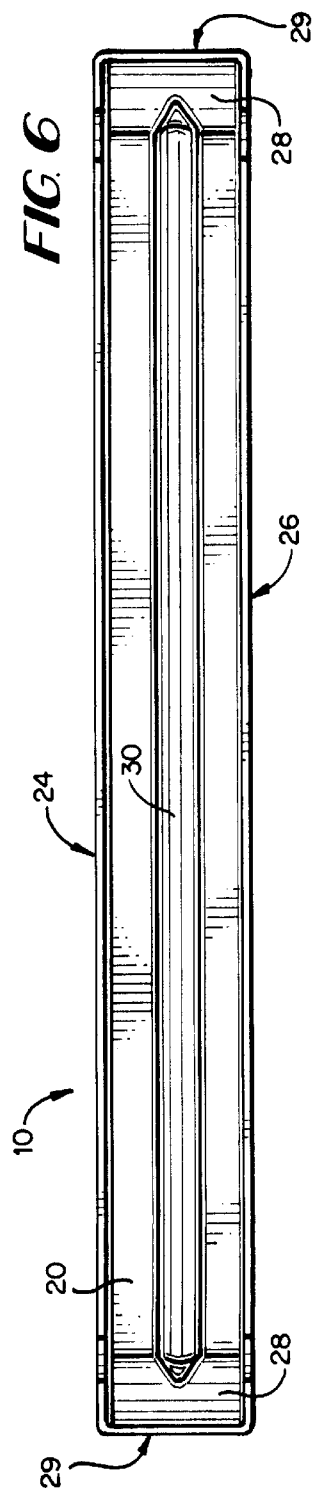

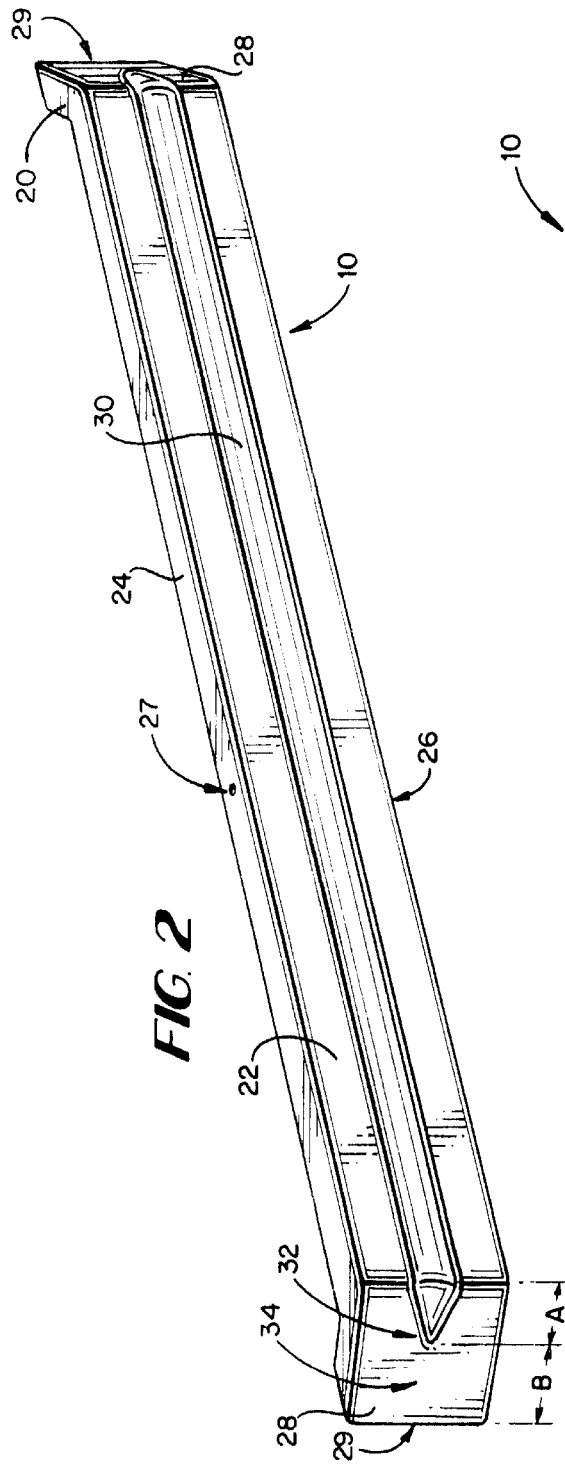
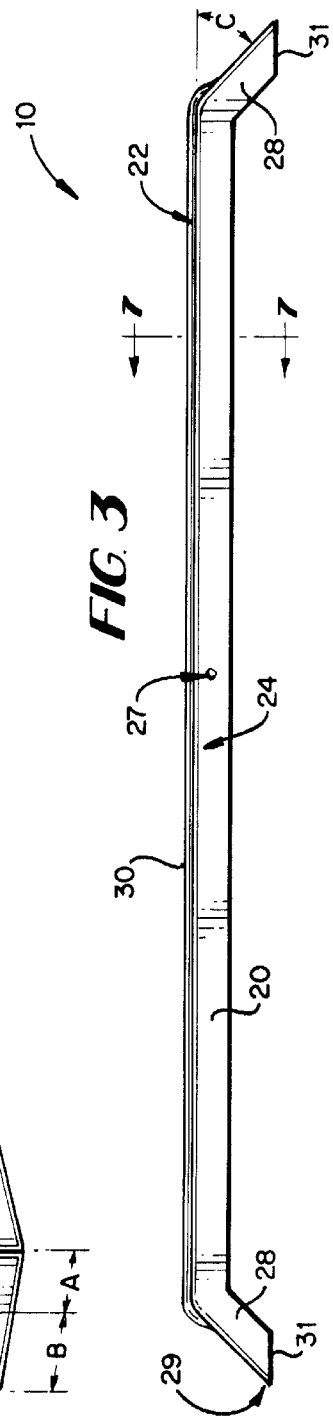
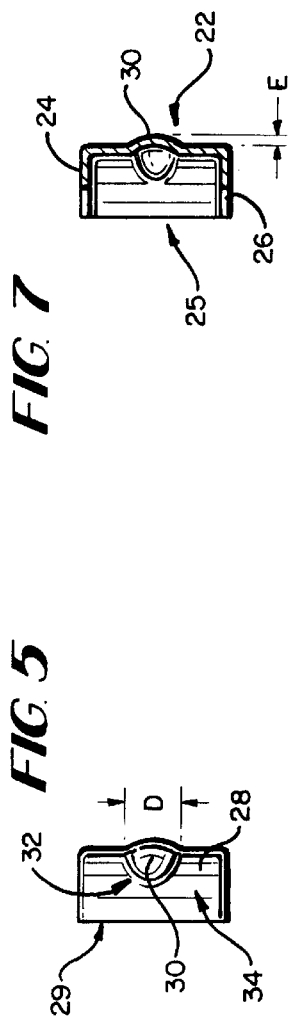
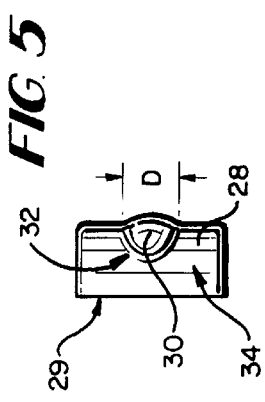

REPETITIVE STAMPED VALVE GUARD

BACKGROUND AND SUMMARY OF THE PRESENT INVENTION

This invention relates to portable tanks, and more particularly to a valve guard for preventing damage to a valve extending from the bottom discharge outlet of a portable tank.

Portable tanks, particularly those intended for fluids, are typically provided with a bottom outlet from which the contents of the tank can be drained. These tanks are also provided with legs for raising the bottom of the tank above ground level in order to allow proper draining of the tank and to allow the tank to be easily transported using forklifts and the like. Valves secured to the tank bottom outlets allow controlled drainage of the tank contents. Unfortunately, these valves are often damaged by improper handling and misdirected forklifts, for example, thereby causing leaks and requiring repeated replacement or repair. It is therefore necessary to provide a valve guard to prevent unnecessary damage to valves on the underside of tanks. Furthermore, it is particularly desirable to provide a high strength valve guard which is capable of being repetitively produced, such as by a metal stamping process.

Previous apparatus related to valve guards for the protection of outlet valves are described in the following U.S. Pat. Nos: D31,742 to Wilhelm; D296,027 to Dietzen; D319,286 to Waltke et al.; 1,469,646 and 1,602,506 to Rowland; 2,327,654 to McIntosh; 2,476,578 to Barnwell; 2,946,223 to Lauer, Jr.; 3,963,144 to Berwald; 4,605,126 to Goedken et al.; and 4,697,528 to Rehbein.

None of the devices shown in the above patents discloses a valve guard having deflector arms extending from the ends of the valve guard at an angle and with a central ridge extending horizontally along the length of the valve guard and along the deflector arms as described by the present invention.

It is thus one object of the present invention to provide a lightweight and durable valve guard for portable tanks and the like.

It is another object of the present invention to provide a valve guard for portable tanks and the like in which multiple valve guards can be quickly and economically manufactured through a repetitive stamping process.

It is a further object of the present invention to provide a valve guard for portable tanks and the like which requires minimal welding, notches, and sheared edges.

It is yet another object of the present invention to provide a valve guard for portable tanks and the like which is of a high strength, one-piece construction.

By the present invention, there is provided a valve guard of high strength construction for portable tanks and the like which is formed of a single elongated piece of metal and which has a central stabilizing ridge which extends outwardly from the front wall of the valve guard and which runs nearly the full length of the valve guard. The valve guard has a deflector arm at each end which extends out from the valve guard body at an angle and which cooperates with tank legs to deflect any misguided forklifts or other machinery away from the valve on the underside of the tank. The central ridge is rounded and can have a width from approximately one-fourth to approximately one-third the width of the front wall of the valve guard. The valve guard is lightweight, durable, and can be formed quickly through a sequence of stamping operations.

BRIEF DESCRIPTION OF THE DRAWINGS

FIG. 1 is a perspective view of the valve guard of the present invention applied to a tank assembly with bottom discharge valve, with the tank and valve shown in broken lines.

FIG. 2 is a perspective view in elevation of the valve guard of the present invention.

FIG. 3 is a top plan view of the valve guard of the present invention.

FIG. 4 is a front elevational view of the valve guard of the present invention.

FIG. 5 is a left end view of the valve guard of the present invention.

FIG. 6 is a rear elevational view of the valve guard of the present invention.

FIG. 7 is a cross-sectional view of the valve guard of the present invention taken along the line 7—7 of FIG. 3.

DESCRIPTION OF THE PREFERRED EMBODIMENTS

As shown in FIGS. 1 through 7, there is provided a valve guard 10 for shielding a valve 12 on the underside 14 of a portable tank 16. The valve guard 10 is an elongated monolithic guard member 20 which may be formed of any of various materials such as stainless steel, carbon steel or aluminum, for example, and which has a front wall 22, a top wall 24, a bottom wall 26, and two deflector arms 28. As shown in FIG. 7, the front 22, top 24 and bottom 26 walls form a channel 25 within the valve guard.

The front wall 22 of the valve guard 10 is formed with an outwardly extending rounded central crease or ridge 30 which extends horizontally along the entire length of the front wall 22 and further extends along the deflector arms 28 of the guard member 20, as shown in FIG. 2. The central ridge 30 enhances the overall strength of the valve guard 10 by dispersing any impacting force away from its point of impact so as to lessen the potential damaging effect. As shown in FIGS. 2 and 5, the central ridge 30 extends along each deflector arm 28 for a distance A and is tapered downwardly along the deflector arms 28 until it merges as at 32 with the face 34 of the deflector arms 28 at a distance B from the edges or outer ends 29 of the deflector arms 28. This is to ensure that the strength of the valve guard is maintained along its entire length while also maintaining an even edge 29 for welding to the legs of the tank. In one embodiment of the invention, distance A is approximately one inch and distance B is approximately 2¼ inches.

As shown in FIGS. 1 and 2, the valve guard deflector arms 28 extend outwardly from the front wall 22 at an angle to meet the legs 18 of the tank 16 to which the valve guard 10 is secured. In one embodiment of the invention, the deflector arms 28 extend towards the outside edges 40 of each leg 18. Such arm extension completely protects the valve 12 by deflecting misguided forklifts and the like when the tank 16 is to be moved. Alternatively, the deflector arms 28 may extend between the inside edges 42 of each leg 18. In one embodiment of the invention, as shown in FIG. 3, the valve guard arms 28 can extend from said front wall 22 at an angle C ranging from approximately 40 degrees to approximately 55 degrees. In a preferred embodiment of the invention, this angle C is 49 degrees.

As shown in FIGS. 5 and 7, the central ridge 30 of the front wall 22 is generally rounded and has a width D and a depth E. This central ridge shape strengthens the valve guard by effectively dispersing the impact of any misdirected forklifts or other intrusive machinery across the entire valve guard. Such dispersion helps to prevent punctures and the like at the point of impact which can penetrate the valve guard and cause damage to the valve. For optimal strength, the central ridge may be centered along the length of the valve guard so as to bisect the front wall 22.

As shown in FIG. 4, the front wall 22 has a width F which is larger than central ridge width D. In one embodiment of the invention, the central ridge width D is from approximately one-fourth to approximately one-third the width F of the front wall 22. Such dimensioning of the central ridge 30 is critical in providing the valve guard of the present invention with sufficient strength and resilience. In one embodiment of the invention, the central ridge width D is approximately one inch and the central ridge depth E ranges from approximately 1/8 inch to approximately 1/4 inch. In this embodiment, the valve guard of the present invention can withstand pressures of up to at least 5500 psi. The valve guard of the present invention can withstand even greater pressures when formed using a material such as stainless steel, for example.

As shown in FIG. 7, the top 24 and bottom 26 walls of the valve guard 10 extend generally perpendicularly from said front wall 22 in a direction opposite the direction of outward extension of the central ridge 30. This allows the valve guard 10 to better absorb any force dispersed by the central ridge as a result of an impacting forklift or the like. The valve guard 10 can be mounted to the tank 16 by welding the deflector arms 28 to the legs 18 of the tank at a short distance, such as about 1/2 inch, below the lowest point of the tank bottom.

As shown in FIGS. 1 through 3, the top wall 24 may be provided with a hole 27 which allows the valve guard to secure various tools which may be needed in the proximity of the valve guard. Such tools may be secured by a chain inserted through hole 27, for example, and can include cam lock adapter caps, for instance. The location of hole 27 preferably extends far enough along the top wall such that any item secured through hole 27 will be clear of the valve 12. In one embodiment of the invention, hole 27 is 3/16 inch in diameter and is located near the approximate midpoint of the length of the top wall 24. In a specific embodiment of the invention where the length of the valve guard 10 is approximately 47 inches, the hole 27 is located approximately 26 inches from the end of the valve guard 10 proximal to the valve 12.

The valve guard of the present invention is capable of much faster production than previous valve guards by employing a repetitive stamping process. First, a long, generally flat, rectangular plate of material, such as stainless steel, for example, is inserted into a notching machine, or notcher. The rectangular plate is of sufficient length to allow for the formation of several valve guards. The notcher punches out pairs of notches along what will become the leading and trailing edges of each individual valve guard. The leading edge is the edge of the plate that is first fed into the notcher. Forming these notches along the leading and trailing edges ensures that the flats 31, shown in FIG. 3, of the deflector arms will properly abut the tank legs when the finished valve guard of the present invention is ultimately welded to the tank legs. In one embodiment of the invention, the notches are formed at about a sixty degree angle to the leading and trailing edges. A shearing machine then cuts the plate member along the trailing edge to form a blank sheet having notched leading and trailing edges. Finally, the blank sheet is brought to a stamping punch and forming die where it is stamped so as to form the valve guard of the present invention, complete with deflector arms and the channel with the central ridge previously described. Once each valve guard is stamped, it is ejected from the system so as to allow the next blank sheet to be stamped. This method of forming the valve guard of the present invention thus eliminates the need for multiple parts and multiple welding procedures and minimizes the need for shearing edges and forming notches.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of forming a valve guard to be used in shielding a valve on the underside of a portable tank, comprising the steps of:
   (a) providing a generally flat, rectangular plate member;
   (b) notching and shearing said plate member so as to form a blank sheet member having notched leading and trailing edges; and
   (c) stamping said blank sheet member in a valve guard forming device so as to form deflector arms, a channel having a front, top, and bottom wall, and a ridge extending along substantially the entire length of said channel front wall.

2. A valve guard for shielding a valve on the underside of a portable tank, comprising:
   an elongated monolithic guard member having a front wall, a top wall, a bottom wall, and two deflector arms, said front wall being formed so as to have upper and lower portions and an outwardly extending rounded central ridge extending horizontally along the entire length of said front wall and further extending along the deflector arms of said guard member, said deflector arms extending outwardly from said front wall at an angle so as to act as a deflector for lifting equipment engaging the underside of said tank.

3. The valve guard of claim 2 wherein each of said deflector arms extends from said front wall at an angle of from about 40 degrees to about 55 degrees.

4. The valve guard of claim 2 wherein each of said deflector arms extends from said front wall at an angle of approximately 49 degrees.

5. The valve guard of claim 2 wherein said central ridge bisects said front wall.

6. The valve guard of claim 2 wherein said central ridge has a width of approximately one-fourth to approximately one-third the width of said front wall.

7. The valve guard of claim 2 wherein said ridge has a depth ranging from approximately 1/8 inch to approximately 1/4 inch and wherein said ridge is approximately one inch in width.

8. The valve guard of claim 2 wherein said top and bottom walls extend generally perpendicularly from said front wall in a direction opposite the direction of outward extension of said central ridge.

9. The valve guard of claim 2 wherein said central ridge extends to within approximately 2 1/4 inches of the edges of said guard member deflector arms and wherein said central ridge is tapered downwardly along said guard member deflector arms.

10. The valve guard of claim 2 further including means for retaining tools to be used in the proximity of the valve guard.

11. The valve guard of claim 10 wherein said retaining means includes a hole in said top wall.

12. The valve guard of claim 11 wherein said hole is located near the approximate midpoint of the length of said top wall.

* * * * *